United States Patent
Magee et al.

(10) Patent No.: US 6,320,721 B1
(45) Date of Patent: Nov. 20, 2001

(54) METHOD AND APPARATUS FOR CONTROLLING A VOICE CONTROL MOTOR IN A HARD DISK DRIVE

(75) Inventors: David P. Magee, Plano; Mark W. Heaton, Irving, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/158,177

(22) Filed: Sep. 21, 1998

(51) Int. Cl.$^7$ .................................................. G11B 5/596
(52) U.S. Cl. ...................................... 360/78.06; 360/78.09
(58) Field of Search ............................. 360/78.04, 78.06, 360/78.09; 318/561

(56) References Cited

U.S. PATENT DOCUMENTS

| | | | |
|---|---|---|---|
| 4,535,372 | 8/1985 | Yeakley | 360/77 |
| 5,050,146 | 9/1991 | Richgels et al. | 369/32 |
| 5,475,545 | 12/1995 | Hampshire et al. | 360/78.06 |
| 5,485,065 | 1/1996 | Kaneko et al. | 318/270 |
| 5,684,653 | * 11/1997 | Knowles | 360/78.04 |
| 6,084,742 | * 7/2000 | Takaishi et al. | 360/78.06 |

FOREIGN PATENT DOCUMENTS

| | | |
|---|---|---|
| 0 344 958 A1 | 12/1989 | (EP) . |
| 0 361 381 A2 | | |
| A3 | 4/1990 | (EP) . |
| 07271446 | 10/1995 | (JP) . |
| WO 90/13113 | 11/1990 | (WO) . |

\* cited by examiner

*Primary Examiner*—Andrew L. Sniezek (57) ABSTRACT

According to one embodiment of the invention, a method of moving a device from a first position to a second position by an actuation system includes moving the device in response to providing a control signal having a first amplitude for a first time period. The method also includes, immediately after the first time period, moving the device in response to providing a control signal having a second amplitude for a second time period, the device having a nonzero velocity after the second time period. The nonzero velocity has a magnitude that allows the device to coast to, and stop at, the second position after the second time period without receiving a control signal.

12 Claims, 3 Drawing Sheets

METHOD AND APPARATUS FOR CONTROLLING A VOICE CONTROL MOTOR IN A HARD DISK DRIVE

TECHNICAL FIELD OF THE INVENTION

This invention relates generally to control systems and more particularly to a method and apparatus for controlling a voice control motor in a hard disk drive.

BACKGROUND OF THE INVENTION

Mass storage devices such as hard disk drive systems generally include a magnetic storage media for storing information, a spindle motor for rotating the storage media, a magnetic read/write head for reading information from or writing information to the magnetic storage media, and an actuator for positioning the read/write head over the storage media. A control system associated with the actuator controls the movement of the actuator.

An actuator in a hard disk drive system places the read/write head in an appropriate location over the magnetic storage media before a read or write operation occurs. Moving the read/write head takes time, though, and during that time the mass storage device cannot store or retrieve information. The average time required for the actuator to move the read/write head is referred to as the "seek time" of the storage device. Shorter seek times are preferable to longer seek times.

In moving the read/write head from one position to another, a conventional control system is modeled as a second order system. A problem with conventional control systems is that the second order system model produces a seek time that may be too long for modern applications. The time it takes for the read/write head to move from position to position is longer than desired, which causes the storage device to operate at a lower level of performance than desired.

SUMMARY OF THE INVENTION

Accordingly, a need has arisen for an improved method and apparatus for controlling a voice control motor in the actuator of a hard disk drive system. The present invention provides a method and apparatus for controlling a voice control motor of a hard disk drive system that addresses shortcomings of prior systems and methods.

According to one embodiment of the invention, a method of moving a device from a first position to a second position by an actuation system includes moving the device in response to providing a control signal having a first amplitude for a first time period. The method also includes, immediately after the first time period, moving the device in response to providing a control signal having a second amplitude for a second time period, the device having a nonzero velocity after the second time period. The nonzero velocity has a magnitude that allows the device to coast to, and stop at, the second position after the second time period without receiving a control signal.

According to another embodiment of the invention, a hard disk drive system includes a disk storage media for storing information and a head for recording and reproducing data in the disk storage media. The hard disk drive system also includes an actuation system for positioning the head relative to the disk storage media and a control system for controlling the actuation system. The actuation system is further operable to move the head from a first position to a second position in response to receiving, from the control system, a control signal having a first amplitude for a first time period, immediately after the first time period receiving, from the control system, a control signal having a second amplitude for a second period of time, and, immediately after the second time period, receiving no control signal. The control signals, in combination with actuation system, generate a velocity and an acceleration for per head that allows the head to coast to the second position after the second time period.

Embodiments of the invention provide numerous technical advantages. For example, in one embodiment of the invention, the device moves from the first position to the second position in less time than with convention control systems. Another advantage of one embodiment of the invention is that the seek time of the device is shorter, resulting in more operations performed by the device in a shorter amount of time. Yet another advantage of one embodiment of the invention is that the overall performance of the device is improved. In another embodiment of the invention, a hard disk control system of a hard disk drive system can easily transition from seek mode, where a read/write head moves to a new position, to tracking mode, where the read/write head is kept on track. Finally, the present invention can be implemented in any system that can be modeled as a third order transfer function.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 5 of the drawings, like numerals being used for like and corresponding parts of the various drawings.

Figure 1:
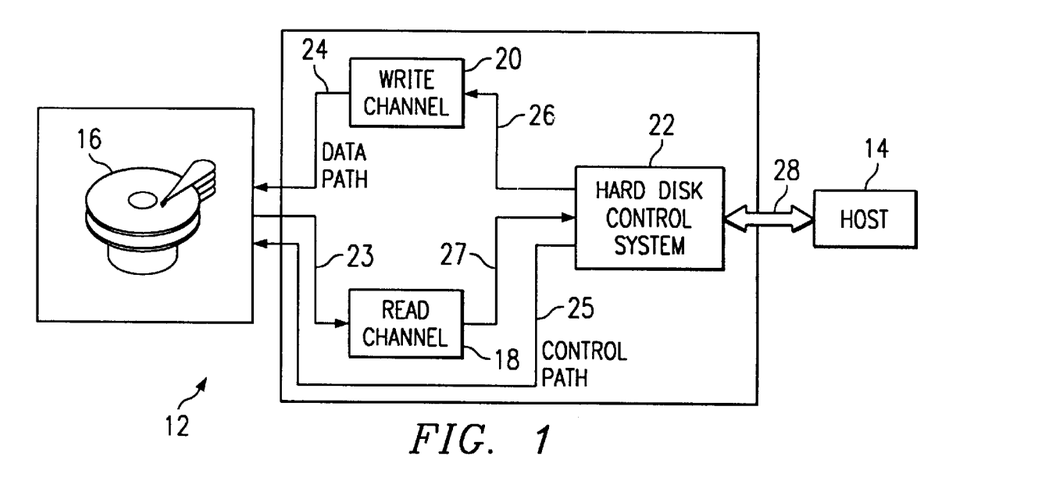
FIG. 1 is a block diagram illustrating a portion of a hard disk drive system, including a disk drive apparatus.

FIG. 1 is a block diagram of a hard disk drive system 12 used for retrieving data during read operations and for storing data during write operations. Hard disk drive system 12 interfaces and exchanges data with a host 14 during read and write operations. Hard disk drive system 12 includes a disk drive apparatus 16, a read channel 18, a write channel 20, and a hard disk control system 22.

Disk drive apparatus 16 is used to magnetically store data. Disk drive apparatus 16 is shown in greater detail in FIG. 2.

Read channel 18, write channel 20, and hard disk control system 22 are used to process data that are read from and written to disk drive apparatus 16. Hard disk control system 22 also controls various operations of hard disk drive system 12. Write channel 20 is coupled to disk drive apparatus 16 through a write data path 24. Read channel 18 is coupled to disk drive apparatus 16 through a read data path 23. Read channel 18 is coupled to hard disk control system 22 through a read data path 27. Write channel 20 is coupled to hard disk control system 22 through a write data path 26. Host 14 exchanges data with hard disk control system 22 through data bus 28.

During read operations, read channel 18 receives an analog data signal from disk drive apparatus 16 through data path 23. Read channel 18 conditions, decodes, and formats the analog data signal and provides a digital data signal to hard disk control system 22 through data path 27. Read channel 18 may include any of a variety of circuit modules such as an automatic gain control circuit, a low pass filter, a variable frequency oscillator, a sampler, and a synchronization field detection circuit.

During write operations, write channel 20 receives a digital data signal from hard disk control system 22 through data path 26. Write channel 20 reformats and codes the digital data signal for storage and provides an analog data signal to disk drive apparatus 16 through data path 24. Write channel 20 may include any of a variety of circuit modules such as a register, a scrambler, a phase locked loop, an encoder, a serializer, and a write precompensation circuit.

Hard disk control system 22 is used to control various operations of hard disk drive system 12 and to exchange digital data with host 14, including disk drive apparatus 16. Hard disk control system 22 generates a control signal 25 that is received by disk drive apparatus 16. Hard disk control system 22 may include a microprocessor, a random access memory, a read-only memory, and a disk controller (not explicitly shown). The microprocessor, random access memory, read-only memory, and disk controller together provide control and logic functions to read channel 18, write channel 20, and disk drive apparatus 16 so that data can be received from host 14, stored, and later retrieved and provided back to host 14. The read-only memory may include preloaded microprocessor instructions for use by the microprocessor in operating and controlling hard disk drive system 12. The random access memory is used to store digital data received from host 14 before the digital data is supplied to write channel 20 for a write operation. The random access memory also stores digital data received from read channel 18 before the data are supplied to host 14 after a read operation. The random access memory may also provide data to and store data from the microprocessor. The disk control includes various logic and bus arbitration circuitry needed to properly interface hard disk control system 12 to host 14.

Figure 2:
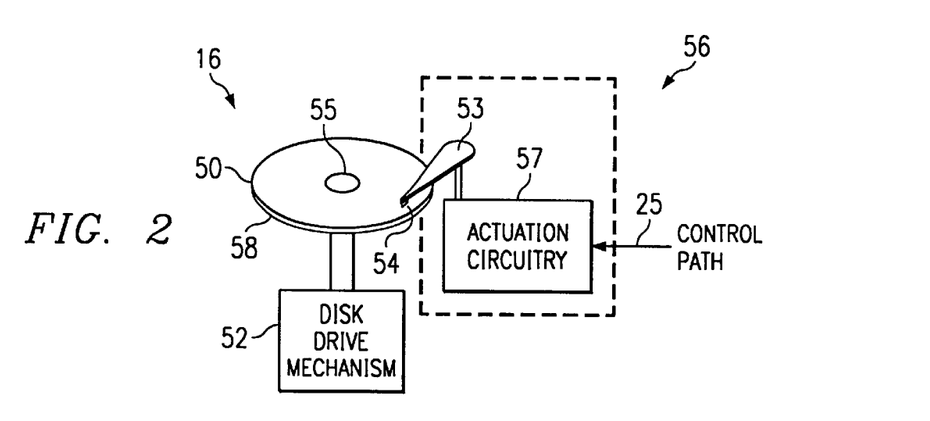
FIG. 2 is a schematic diagram illustrating a partial view of the disk drive apparatus of FIG. 1, showing the control of the movement of a magnetic head by a control system.

FIG. 2 is a schematic diagram of disk drive apparatus 16 shown in FIG. 1. Disk drive apparatus 16 is used to magnetically store and retrieve data. Disk drive apparatus 16 includes a storage media 50, a disk drive mechanism 52, a read/write head 54, and an actuation system 56. Actuation system 56 includes a read/write head arm 53 and actuation circuitry 57 for positioning read/write head arm 53.

In one embodiment, storage media 50 is a rotating magnetic disk or platter that stores data represented as magnetic transitions on a surface of the magnetic platter. Although storage media 50 is illustrated in FIG. 2 as a single magnetic platter, disk drive apparatus 16 can include multiple magnetic disks or platters. Storage media 50 illustrated in FIG. 2 has a center 55 and an outer edge 58.

Disk drive mechanism 52 rotates storage media 50 at a desired rate. An example disk drive apparatus 16 uses disk drive mechanism 52 that rotates storage media 50 at a rate of approximately 10,000 revolutions per minute. Disk drive mechanism 52 may be any of a number of available mechanisms operable to rotate storage media 50 such as a spindle motor.

Read/write head 54 stores and retrieves data from a single surface of storage media 50. Although only one read/write head 54 is illustrated in FIG. 2, a second read/write head can be provided to store data to and retrieve data from the opposite side of the magnetic platter illustrated in FIG. 2. Also, if multiple magnetic platters are used for storage media 50, read/write heads can be provided for each surface of each magnetic platter. Read/write head 54 may be any of a number of available read/write heads such as magneto-resistive heads.

During read operations, read/write head 54 deciphers the magnetic transitions stored on storage media 50. Read/write head 54 then sends an analog data signal to read channel 18. During write operations, read/write head 54 receives an analog data signal from write channel 20. Read/write head 54 then records the analog data signal as magnetic transitions on storage media 50.

Read or write operations cannot occur until read/write head 54 is in an appropriate location over the surface of storage media 50. Actuation circuitry 57 moves read/write head 54 by moving read/write head arm 53 to the appropriate location in response to receiving control signal 25 from hard disk control system 22. In a series of read and write operations, actuation circuitry 56 moves read/write head 54 back and forth over the surface of storage media 50. Actuation circuitry 57 is shown in greater detail in FIG. 3, which is now described.

Figure 3:
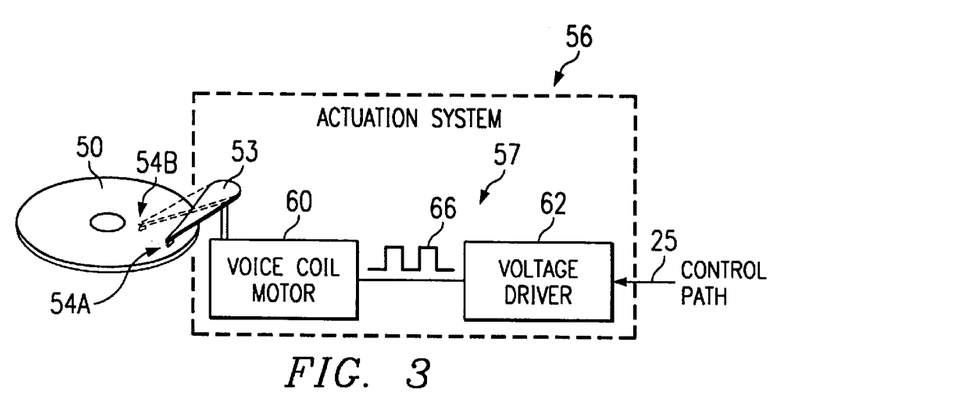
FIG. 3 is a schematic diagram illustrating the control system of FIG. 2, showing the control of the movement of the magnetic head by a voltage driver and a voice coil motor.

FIG. 3 is a schematic diagram of one embodiment of actuation system 56 shown in FIG. 2 in combination with storage media 50. Actuation system 56 moves read/write head 54 so read/write head 54 can store or retrieve data from different locations on the surface of storage media 50. Actuation circuitry 57 within actuation system 56 includes a voice coil motor 60 and a voltage driver 62.

Voltage driver 62 controls the behavior of voice coil motor 60. Voltage driver 62 outputs an amplified control signal 66 to voice coil motor 60 in response to receiving control signal 25 from hard disk control system 22. Voltage driver 62 includes a device that outputs a voltage signal and associated control circuitry (not explicitly shown). Hard disk control system 22 determines an amplitude of control signal 66 and a length of time that the amplitude will last. Thus voltage driver 62 operates to amplify control signal 25 and provide the amplified signal to voice coil motor 60.

Voice coil motor 60 moves read/write head 54 from one location to another over the surface of storage media 50. This movement is illustrated in FIG. 3 in which voice coil motor 60 moves read/write head 54 from position 54A to position 54B. Voice coil motor 60 operates in several different modes. Voice coil motor 60 can operate in an active mode when it receives a nonzero signal from voltage driver 62. Voice coil motor 60 can also operate in an inactive mode when the signal from the voltage driver is zero. If read/write head 54 is at rest when voice coil motor 60 enters an inactive mode, absent external disturbances, read/write head 54 will not move. If read/write head 54 is in motion when voice coil motor 60 enters an inactive mode, such as when voice coil motor 60 is decelerating read/write head 54, voice coil motor 60 allows read/write head 54 to coast to another position.

In one embodiment of the invention, the time rate of change of the angular acceleration of read/write head 54 is dependent upon control signal 66. The time rate of change of acceleration is often referred to as "jerk."

Figure 4A:
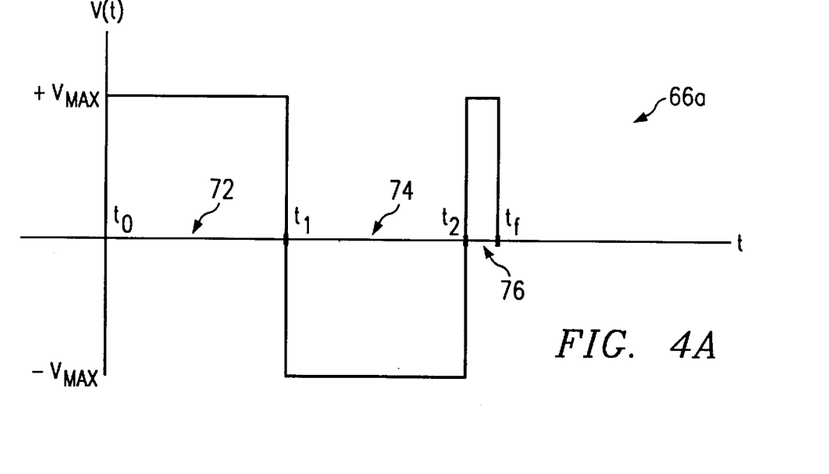
FIGS. 4A–4C are timing diagrams illustrating the behavior of the voltage driver of FIG. 3 and the movement of the magnetic head.
Figure 4B:
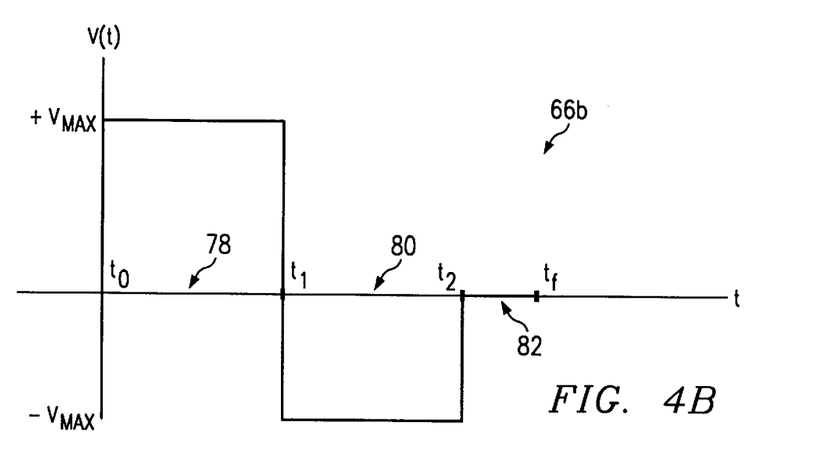

In order for voice coil motor 60 to move read/write head 54 from a first position to a second position, voltage driver 62 provides an amplified control signal 66 in response to control signal 25 that has a proper voltage for the correct length of time. FIGS. 4A and 4B, which are now described, illustrate two examples of control signal 66.

Figure 4C:
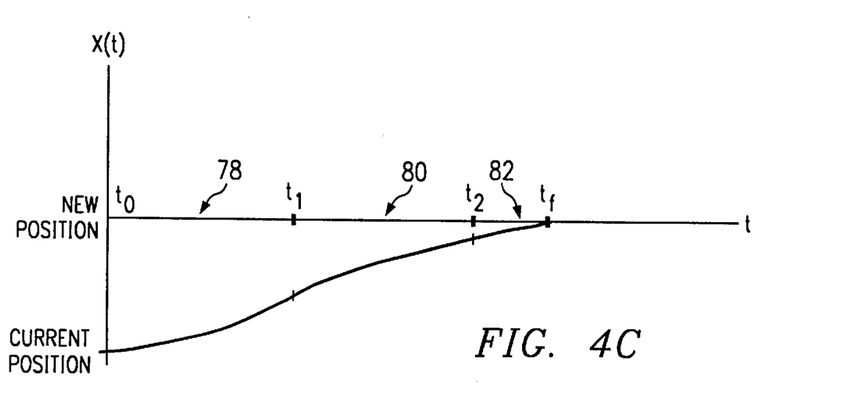

FIGS. 4A through 4C are timing diagrams illustrating the behavior of one embodiment of voltage driver 62 and the movement of read/write head 54 caused by hard disk control system 22. As described below, according to the invention, actuation system 56, comprising voice coil motor 60, voltage driver 62, and read/write head arm 53 is modeled as a third order system by a third order transfer function. Modeling actuation system 56 as a third order transfer function facilitates providing an appropriate control signal 66 for moving read/write head 54 from a first position to a second position in a shorter time period than if actuation system 56 was modeled as a second order system. Also according to the invention, an appropriate control signal 66 is provided that causes read/write head 54 to move from a first position to a second position in a shorter period than permitted by prior systems and methods.

FIG. 4A illustrates one example of control signal 66 produced by hard disk drive control system 22 and amplified by voltage driver 62. The shape of control signal 66a in FIG. 4A is optimal and causes voice coil motor 60 to move read/write head 54 from its current position to a new position in a theoretical minimum seek time for a third order system. Hard disk control system 22 provides control signal 66a that causes voice coil motor 60 to move read/write head 54 for a first time period 72 from its initial position to a first intermediate position, move read/write head 54 for a second time period 74 from the first intermediate position to a second intermediate position, and move read/write 54 for a third time period 76 from the second intermediate position to a desired final position. Third time period 76 is extremely short in comparison to first time period 72 and second time period 74. Third time period 76 is exaggerated in FIG. 4A for clarity of illustration. However, providing control signal 66a illustrated in FIG. 4A is often impractical because of the inability of electronic circuitry to produce control signal 66a having an extremely short third time period 76. Furthermore, determining time periods 72, 74, and 76 can currently only be performed iteratively.

FIG. 4B illustrates another example of control signal 66 produced by hard disk control system 22 and amplified by voltage driver 62. The invention recognizes that the shape of control signal 66b illustrated in FIG. 4B causes voice coil motor 60 to move read/write head 54 from its current position to a new position in a time that is close to the theoretical minimum seek time for a third order system. According to the invention, to move read/write head 54 from its current position to a new position rapidly, hard disk drive control system 22 produces a control signal that is amplified by voltage driver 62 to provide control signal 66b that causes voice coil motor 60 to move read/write 54 for a first time period 78 to a first intermediate position, move read/write head 54 for a second time period 80 to a second intermediate position, and enter an inactive mode for a third time period 82 as read/write head coasts to its final position. The invention further recognizes that instead of driving read/write head 54 to a given end position from which data will be read or data will be written, it is advantageous to drive read/write head 54 to a desired velocity and acceleration at a given position, and then terminate the control signal and allow the read/write head 54 to coast to the desired position for reading or writing data. The velocity and acceleration of read/write head 54 are zero at the desired final position. The control signal illustrated in FIG. 4B is a particularly advantageous example of a control signal that drives read/write head 54 to a desired velocity and acceleration at a given position and then allows read/write head 54 to coast to its final position for reading or writing data; however, other shapes for control signal 66b may be utilized.

In FIG. 4B, assuming a zero initial velocity and acceleration just before the first time period, a positive voltage provided by voltage driver 62 causes voice coil motor 60 to accelerate read/write head 54 during first time period 78. Voice coil motor 60 decelerates read/write head 54 in response to a negative voltage during second time period 80. Voice coil motor 60 enters an inactive mode when voltage driver 62 provides no voltage during third time period 82. Because read/write head 54 has some positive velocity after second time period 80 elapses, read/write head 54 coasts to a new position. Read/write head 54 eventually coasts to a complete stop due to electrical and mechanical energy effects in actuation system 56. The lengths of first time period 78 and second time period 80 are described in greater detail below. Utilizing control signal 66b results in a seek time that is typically within three to four percent of the theoretical minimum seek time. This generally amounts to a fraction of a millisecond.

The invention recognizes that, instead of providing a control signal that drives read/write head 54 to a desired position, a control signal can be provided that drives read/write head to a desired position, velocity, and acceleration such that the read/write head can coast, with no control signal, to a stop at the desired position. Control signal 66b is a particular example of a control signal that moves read/write head 54 from a first position to a second position in a near minimum amount of time; however, control signals having alternative shapes that drive read/write head 54 to a desired position, velocity, and acceleration before allowing read/write head 54 to coast to a desired position may also be used.

FIG. 4C illustrates the movement of read/write head 54 caused by hard disk control system 22 when voltage driver 62 provides control signal 66b illustrated in FIG. 4B. Assuming an initial velocity and acceleration of zero, during first time period 78, voice coil motor 60 accelerates read/write head 54. During second time period 80, voice coil motor decelerates read/write head 54. During first time period 78 and second time period 80, voice coil motor 60 changes the position of read/write head 54. Voice coil motor 60 moves read/write head 54 from a current position towards a new position. After second time period 80 elapses, voice coil motor enters an inactive mode because voltage driver 62 provides no voltage 82, and read/write head 54 coasts to a new position.

The lengths of first time period 78 and second time period 80 are determined to ensure that read/write head 54 has the correct position, velocity, and acceleration so that read/write head 54 can coast to the new position after the control signal is terminated. Before signaling voice coil motor 60 to move read/write head 54, hard disk control system 22 determines the lengths of first time period 78 and second time period 80. Hard disk control system 22 determines the lengths of the time periods based on a model of the behavior of actuation system 56. Actuation system 56, comprising voice coil motor 60, voltage driver 62, and read/write head arm 53 can be modeled as a third order transfer function, P(s), having the equation $$P(s) = \frac{K_s}{s(s+\beta_1)(s+\beta_2)} \quad \text{(Eq. 1)}$$

where $$K_s = \frac{K_t K_d}{L_m J} \quad \text{(Eq. 2)}$$

$$\beta_1 = \frac{1}{2}\left(\frac{R_m}{L_m} + \sqrt{\frac{R_m^2}{L_m^2} - 4K_b\frac{K_t}{L_m J}}\right) \quad \text{(Eq. 3)}$$

and $$\beta_2 = \frac{1}{2}\left(\frac{R_m}{L_m} - \sqrt{\frac{R_m^2}{L_m^2} - 4K_b\frac{K_t}{L_m J}}\right). \quad \text{(Eq. 4)}$$

In Equation 1, $\beta_1$ and $\beta_2$ are referred to as "poles" of the third order system. For actuation system 56, $\beta_1$ is related to the electrical time constant of actuation system 56, and $\beta_2$ is related to the mechanical time constant of actuation system 56. In Equations 2 through 4, $K_t$ represents the torque constant of voice coil motor 60, $K_d$ represents the gain of voltage driver 62, $L_m$ represents the inductance of voice coil motor 60, and J represents the inertia of actuation system 56. In Equations 3 and 4, $R_m$ represents the resistance of voice coil motor 60, and $K_b$ represents the back electromotive force constant of voice coil motor 60.

The third order system can be transformed into a state space representation. Variable $\theta$ in the state space representation relates to an angular position of voice coil motor 60 and the other variables represent time derivatives of the angular position. A state space vector containing the variables has the equation $$\begin{bmatrix} x_1 \\ x_2 \\ x_3 \end{bmatrix} = \begin{bmatrix} \theta \\ \dot{\theta} \\ \ddot{\theta} \end{bmatrix}. \quad \text{(Eq. 5)}$$

Using Equation 5, the state space representation of actuation system 56 having voice coil motor 60 and voltage driver 62 can be described using the formula $$\begin{bmatrix} \dot{x}_1 \\ \dot{x}_2 \\ \dot{x}_3 \end{bmatrix} = \begin{bmatrix} 0 & 1 & 0 \\ 0 & 0 & 1 \\ 0 & -\beta_1\beta_2 & -(\beta_1+\beta_2) \end{bmatrix} \begin{bmatrix} x_1 \\ x_2 \\ x_3 \end{bmatrix} + \begin{bmatrix} 0 \\ 0 \\ K_S \end{bmatrix} V(t). \quad \text{(Eq. 6)}$$

A first order set of differential equations can be derived from Equation 6 and solved to represent the step response of read/write head 54 to a control signal, V(t) having an amplitude of $V_{max}$.

$$x_1(t) = x_1(t_0) + \frac{\beta_2 x_2(t_0) + x_3(t_0)}{\beta_1(\beta_1-\beta_2)}(e^{-\beta_1(t-t_0)} - 1) - \quad \text{(Eq. 7)}$$
$$\frac{\beta_1 x_2(t_0) + x_3(t_0)}{\beta_2(\beta_1-\beta_2)}(e^{-\beta_2(t-t_0)} - 1) + \frac{K_S V_{max}}{\beta_1 \beta_2}(t-t_0) -$$
$$\frac{K_S V_{max}}{\beta_1 - \beta_2}\left(\frac{1}{\beta_1^2}(e^{-\beta_1(t-t_0)} - 1) - \frac{1}{\beta_2^2}(e^{-\beta_2(t-t_0)} - 1)\right)$$

$$x_2(t) = -\frac{\beta_2 x_2(t_0) + x_3(t_0)}{\beta_1 - \beta_2}e^{-\beta_1(t-t_0)} + \quad \text{(Eq. 8)}$$
$$\frac{\beta_1 x_2(t_0) + x_3(t_0)}{\beta_1 - \beta_2}e^{-\beta_2(t-t_0)} + \frac{K_S V_{max}}{\beta_1 \beta_2} +$$
$$\frac{K_S V_{max}}{\beta_1 - \beta_2}\left(\frac{1}{\beta_1}e^{-\beta_1(t-t_0)} - \frac{1}{\beta_2}e^{-\beta_2(t-t_0)}\right)$$

$$x_3(t) = \frac{\beta_1(\beta_2 x_2(t_0) + x_3(t_0))}{\beta_1 - \beta_2}e^{-\beta_1(t-t_0)} - \quad \text{(Eq. 9)}$$
$$\frac{\beta_2(\beta_1 x_2(t_0) + x_3(t_0))}{\beta_1 - \beta_2}e^{-\beta_2(t-t_0)} -$$
$$\frac{K_S V_{max}}{\beta_1 - \beta_2}(e^{-\beta_1(t-t_0)} - e^{-\beta_2(t-t_0)}).$$

In Equations 7 through 9, t represents time, $x_1(t)$ represents the angular position of read/write head 54 at time t, $x_2(t)$ represents the angular velocity of read/write head 54 at time t, and $x_3(t)$ represents the angular acceleration of read/write head 54 at time t. Also, $t_0$ represents the time right before the input is applied, $x_1(t_0)$ represents the angular position of read/write head 54 at time $t_0$, $x_2(t_0)$ represents the angular velocity of read/write head 54 at time $t_0$, and $X_3(t_0)$ represents the angular acceleration of read/write head 54 at time $t_0$.

As described above, determining time periods 72, 74, and 76 can only be performed iteratively. The invention recognizes that if voltage driver 62 provides control signal 66b illustrated in FIG. 4B to voice coil motor 60, a seek time that approximates the theoretical minimum seek time may be achieved. Equations 7 through 9 may be used to determine first time period 78 and second time period 80 for control signal 66b. The control circuitry of hard disk control system 22 implements those formulas to determine the lengths of first time period 78 and second time period 80. The length of first time period 78, represented by the variable $T_1$, may be calculated from Equations 7 through 9 to be:

$$T_1 = \frac{1}{\beta_2}\log\left(C_2\left(1 - \sqrt{1 - \frac{e^{-\beta_2 C_1}}{C_2}}\right)\right) \quad \text{(Eq. 10)}$$

In Equation 10, the variables $C_1$ and $C_2$ are determined for two possible input shapes of control signal 66b. For the first case, control signal 66b is as shown in FIG. 4B with a positive voltage during first time period 78 and a negative voltage during second time period 80. This profile of control signal 66b is referred to as a "Plus-Minus Off" input. In the second case, control signal 66b is negative during first time period 78 and positive during second time period 80. Such a profile for control signal 66b is referred to as a "Minus-Plus-Off" input. Whether a "Plus-Minus-Off" input or a "Minus-Plus-Off" input will result in positioning of read/write head 54 at the appropriate position depends on the initial velocity and acceleration of read/write 54 as well as the relative position between the current position of read/write head 54 and the desired position of read/write head 54. The appropriate input profile may be determined by calculating the final position resulting from each profile and selecting the profile that provides the desired final position.

For a Plus-Minus-Off Input, $$C_1 = \frac{-(\beta_1\beta_2 x_1(t_0) + (\beta_1+\beta_2)x_2(t_0) + x_3(t_0))}{K_s V_{max}} \quad \text{(Eq. 11)}$$

and $$C_2 = \frac{K_s V_{max}}{K_s V_{max} - \beta_2(\beta_1 x_2(t_0) + x_3(t_0))} \quad \text{(Eq. 12)}$$

For a Minus-Plus-Off Input $$C_1 = \frac{\beta_1\beta_2 x_1(t_0) + (\beta_1+\beta_2)x_2(t_0) + x_3(t_0)}{K_s V_{max}} \quad \text{(Eq. 13)}$$

and $$C_2 = \frac{K_s V_{max}}{K_s V_{max} + \beta_2(\beta_1 x_2(t_0) + x_3(t_0))} \quad \text{(Eq. 14)}$$

The length of second time period 80 is calculated according to the formula:

$$T_2 = T_1 - C_1 \quad \text{(Eq. 15)}$$

In Equations 10 and 11, $V_{max}$ represents the maximum amplitude of control signal 66 that voltage driver 62 can output. Values for the constant $K_s$ can be calculated and incorporated directly into the control circuitry of hard disk control system 22.

Hard disk control system 22 uses the lengths of time periods 78 and 80 to output a proper control signal 66 to voice coil motor 60. With control signal 66, voice coil motor 60 moves read/write head 54 from a current position to a new position in a time that closely approximates the theoretical minimum seek time. Because voice coil motor 60 moves read/write head 54 in a time that is close to the theoretical minimum seek time, the seek time of hard disk drive system 12 decreases. The overall performance of hard disk drive system 12 improves as a result.

Figure 5:
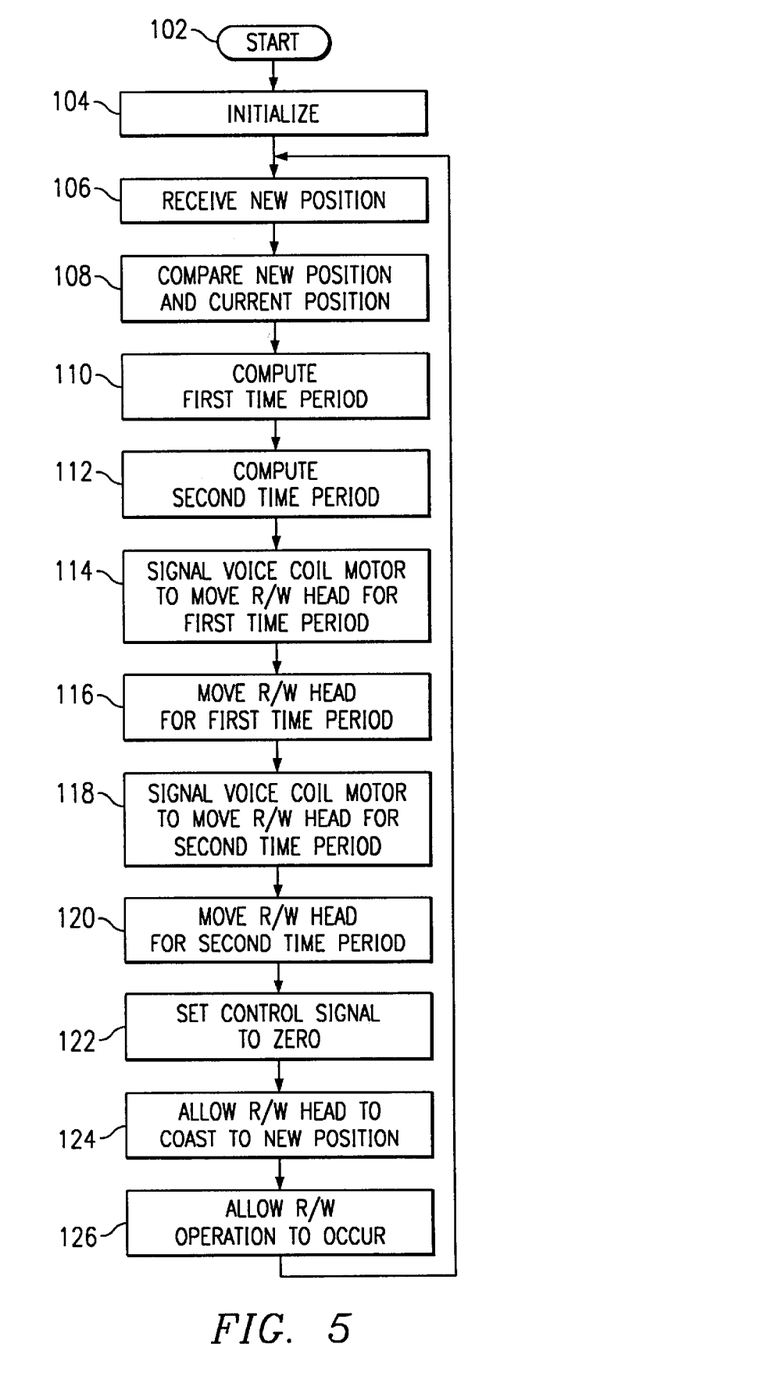
FIG. 5 is a flowchart illustrating a method for moving the magnetic head of the hard disk drive system from one position to another according to the teachings of the present invention.

FIG. 5 is a flowchart illustrating a method for moving read/write head 54 of disk drive apparatus 16 from a first position to a second position according to the teachings of the present invention. The method begins at a step 102. At step 104, hard disk drive system 12 is initialized. This may include, for example, resetting the microprocessor of hard disk control system 22, resetting the control circuitry of voltage driver 62, setting voltage driver 62 to output a control signal 66 having no voltage, placing read/write head 54 in a default position, and running diagnostics on disk drive apparatus 16.

At step 106, control system 22 waits to receive a new position for read/write head 54 over data path 28. Once hard disk control system 22 receives a new position, at step 108 hard disk control system 22 compares the new position to the current position of read/write head 54.

Based on the current position, velocity, and acceleration of read/write head 54 and the new position, at step 110 the control circuitry of hard disk control system 22 determines the length of first time period 78 using Equation 10 above, and, in doing so, also determines whether the voltage applied will be positive or negative. One method for determining whether the voltage applied should be positive or negative is to calculate the final position resulting from both an initial positive voltage and an initial negative voltage and to compare the positions to the desired final position. The position that matches the desired final position indicates whether the initial voltage applied should be positive or negative. Next, at step 112 the control circuitry of hard disk control system 22 determines the length of second time period 80 using Equation 15 above.

Using the result from step 110, at step 114 hard disk control system 22 commands voltage driver 62 to signal voice coil motor 60 to move read/write head 54 by providing control signal 66 having either a positive or negative polarity. Hard disk control system 22 maintains this signal for the length of first time period 78. At step 116 voice coil motor 60 responds to control signal 66 provided by voltage driver 62 by moving read/write head 54.

Using the result from step 112, once first time period 78 elapses, at step 118 voltage driver 62 immediately outputs control signal 66 having the opposite polarity that control signal 66 had in step 114. Voltage driver 62 maintains this signal for the length of second time period 80. At step 120 voice coil motor 60 responds to control signal 66 provided by voltage driver 62 by moving read/write head 54.

Immediately after second time period 80 elapses, at step 122 control signal 66 is set to zero. Voice coil motor 60 responds by entering an inactive state at a step 124, and voice coil motor 60 allows read/write head 54 to coast to a new position. Once at the new position, read/write head 54 performs either a read or a write operation at a step 126. Hard disk control system 22 repeats the process by waiting to receive another new position through data path 28.

This method provides numerous advantages over prior control systems. This method allows a device to move from a first position to a second position in a time that closely approximates the theoretical minimum seek time. The seek time of the device is shorter, resulting in an increase in the overall performance of the device.

Those skilled in the art will recognize that several steps in FIG. 4 can be reordered without affecting the end result of the present invention. For example, rather than computing both first time period 78 and second time period 80 at steps 110 and 112, it is possible to compute first time period 78 at step 110, and then signal voice coil motor 60 to move read/write head 54 at step 114. While voice coil motor 60 is moving read/write head 54 at step 116, the control circuitry of hard disk control system 22 could compute the length of second time period 80.

Although the present invention and its advantages have been described in detail, it should be understood the various changes, substitutions, and alterations can be made therein without departing from the spirit and scope of the present invention as defined by the appended claims.

What is claimed is:

1. A method of moving a head in a hard disk drive system from a first position to a second position by an actuation system, the method comprising:

moving the head in response to providing, to the actuation system, a control signal having a first amplitude for a first time period;

immediately after the first time period, moving the head in response to providing a control signal, to the actuation system, having a second amplitude for a second time period, the head having a nonzero velocity after the second time period; and wherein the nonzero velocity has a magnitude that allows the head to coast to, and stop at, the second position after the second time period without receiving an additional control signal; and wherein the actuation system is modeled as a third order transfer function, the third order transfer function having a first nonzero pole and a second nonzero pole, the second pole slower than the first pole and wherein providing a control signal for a first time period comprises providing a control signal for a first time period having a duration that is a function of the first pole and the second pole.

2. A method of moving a head in a hard disk drive system from a first position to a second position by an actuation system, the method comprising:

moving the head in response to providing, to the actuation system, a control signal having a first amplitude for a first time period;

immediately after the first time period, moving the head in response to providing a control signal, to the actuation system, having a second amplitude for a second time period, the head having a nonzero velocity after the second time period; and wherein the nonzero velocity has a magnitude that allows the head to coast to, and stop at, the second position after the second time period without receiving an additional control signal; and wherein the actuation system is modeled as a third order transfer function, the third order transfer function having a first nonzero pole and a second nonzero pole, the second pole slower than the first pole, and wherein providing a control signal for a first time period comprises providing a control signal for a first time period having a duration of $$T_1 = -\frac{1}{\beta 2}\log\left(C_2\left(1 - \sqrt{1 - \frac{e^{-\beta_2 C_1}}{C_2}}\right)\right)$$

where $$C_1 = \frac{-(\beta_1\beta_2 x_1(t_0) + (\beta_1\beta_2)x_2(t_0) + x_3(t_0))}{K_s V_{\max}},$$

and $$C_2 = \frac{K_s V_{\max}}{K_s V_{\max} + \beta_2(\beta_1 x_2(t_0) + x_3(t_0))},$$

where $T_1$ is the first time period, $K_s$ is a constant, $V_{max}$ is the magnitude of the first amplitude and also the magnitude of the second amplitude, $\beta_1$ is the first nonzero pole, $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time $t_0$.

3. The method of claim 2, wherein providing a control signal for a second time period comprises providing a control signal for a second time period having a duration of $$T_2 = T_1 - f(\beta_1, \beta_2)$$

where $T_2$ is the second time period.

4. The method of claim 2, wherein providing a control signal for a second period of time comprises providing a control signal for a second time period having a duration of $$T_2 = T_1 - C_1$$

where $T_2$ is the second time period.

5. A method of moving a head in a hard disk drive system from a first position to a second position by an actuation system, the method comprising:

moving the head in response to providing, to the actuation system, a control signal having a first amplitude for a first time period;

immediately after the first time period, moving the head in response to providing a control signal, to the actuation system, having a second amplitude for a second time period, the head having a nonzero velocity after the second time period; and wherein the nonzero velocity has a magnitude that allows the head to coast to, and stop at, the second position after the second time period without receiving an additional control signal; and wherein the actuation system is modeled as a third order transfer function, the third order transfer function having a first nonzero pole and a second nonzero pole, the second pole slower than the first pole and wherein providing a control signal for a first time period comprises providing a control signal for a first time period having a duration of $$T_1 = -\frac{1}{\beta 2}\log\left(C_2\left(1 - \sqrt{1 - \frac{e^{-\beta_2 C_1}}{C_2}}\right)\right),$$

where $$C_1 = \frac{\beta_1\beta_2 x_1(t_0) + (\beta_1\beta_2)x_2(t_0) + x_3(t_0)}{K_s V_{\max}},$$

and $$C_2 = \frac{K_s V_{\max}}{K_s V_{\max} + \beta_2(\beta_1 x_2(t_0) + x_3(t_0))}$$

where $T_s$ is the first time period, $K_s$ is a constant, $V_{max}$ is the magnitude of the first amplitude and al so the magnitude of the second amplitude, $\beta_1$ is the first nonzero pole, $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time $t_0$.

6. A method of moving a head in a hard disk drive system from a first position to a second position by an actuation system, the method comprising:

moving the head in response to providing, to the actuation system, a control signal having a first amplitude for a first time period;

immediately after the first time period, moving the head in response to providing a control signal, to the actuation system, having a second amplitude for a second time period, the head having a nonzero velocity after the second time period; and wherein the nonzero velocity has a magnitude that allows the head to coast to, and stop at, the second position after the second time period without receiving an additional control signal; and wherein the actuation system is modeled as a third order transfer function, the third order transfer function having a first nonzero pole and a second nonzero pole, the second pole slower than the first pole, and wherein providing a control signal for a second time period comprises providing, to the actuation system, a control signal for a second time period having a duration of $$T_2 = T_1 - f(\alpha_1, \beta_2)$$

where $T_2$ is the second time period, $T_1$ is the first time period, $\beta_1$ is the first pole, and $\beta_2$ is the second pole.

7. A method of moving a head in a hard disk drives system from a first position to a second position by an actuation system, the method comprising:

moving the head in response to providing, to the actuation system, a control sit having a first amplitude for a first time period;

immediately after the first time period, moving the head in response to providing a control signal, to the actuation system, having a second amplitude for a second time period, the head having a nonzero velocity after the second time period;

wherein the nonzero velocity has a magnitude that allows the head to coast to, and stop at, the second position after the second time period without receiving an additional control signal; and wherein the actuation system is modeled as a third order transfer function, the third order transfer function having a first nonzero pole and a second nonzero pole, the second pole slower than the first pole, and wherein providing a control signal for a second period of time comprises providing, to the actuation system, a control signal for a second time period having a duration of $$T_2 = T_1 - C_1$$

where $T_2$ is the second time period, $T_1$ is the first time period, and $$C_1 = \frac{-(\beta_1\beta_2 x_1(t_0) + (\beta_1 + \beta_2)x_2(t_0) + x_3(t_0))}{K_s V_{max}};$$

where $K_s$ is a constant and $V_{max}$ is the magnitude of the first amplitude and also the magnitude of the second amplitude, $\beta_1$ is the first nonzero pole, $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time $t_0$.

8. A hard disk drive system comprising:

a disk storage media for storing information;

a head for recording and reproducing data in the disk storage media;

an actuation system for positioning the head relative to the disk storage media;

a control system for controlling the actuation system;

wherein the actuation system is operable to move the head from a first position to a second position in response to receiving, from the control system, a control signal having a first amplitude for a first time period, immediately after the first time period receiving, from the control system, a control signal having a second amplitude for a second period of time, and, after the second period of time receiving no control signal;

wherein the control signals during the first and second time periods, in combination with the actuation system, generate a velocity and an acceleration for the head that allows the head to coast to the second position after the second time period; and wherein the actuation system is modeled by a third order transfer function having an integrator, a first pole, and a second pole, the second pole slower than the first pole, and wherein the actuation system is further operable to move the head from the first position to the second position by receiving a control signal for a first time period having a duration of $T_1$=function of($\beta_1,\beta_2$), where $T_1$ is the first time period, $\beta_1$ is the first pole, and $\beta_2$ is the second pole.

9. A hard disk drive system comprising:

a disk storage media for storing information;

a head for recording and reproducing data in the disk storage media;

an actuation system for positioning the head relative to the disk storage media;

a control system for controlling the actuation system;

wherein the actuation system is operable to move the head from a first position to a second position in response to receiving, from the control system, a control signal having a first amplitude for a first time period, immediately after the first time period receiving, from the control system, a control signal having a second amplitude for a second period of time, and, after the second period of time receiving no control signal;

wherein the control signals during the first and second time periods, in combination with the actuation system, generate a velocity and an acceleration for the head that allows the head to coast to the second position after the second time period; and wherein the actuation system is modeled by a third order transfer function having an integrator, a first pole, and a second pole, the second pole slower than the first pole, and wherein the actuation system is further operable to move the head from the first position to the second position in response to receiving a control signal for a first time period having a duration of $$T_1 = -\frac{1}{\beta_2}\log\left(C_2\left(1 - \sqrt{1 - \frac{e^{-\beta_2 C_1}}{C_2}}\right)\right);$$

$$C_1 = \frac{(\beta_1\beta_2 x_1(t_0) + (\beta_1 + \beta_2)x_2(t_0) + x_3(t_0))}{K_s V_{max}}$$

and $$C_2 = \frac{K_s V_{max}}{K_s V_{max} - \beta_2(\beta_1 x_2(t_0) + x_3(t_0))}$$

where $K_s$ is a constant, $V_{max}$ is a constant, $\beta_1$ is the first nonzero pole, $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time $t_0$.

10. A hard disk drive system comprising:

a disk storage media for storing information;

a head for recording and reproducing data in the disk storage media;

an actuation system for positioning the head relative to the disk storage media;

a control system for controlling the actuation system;

wherein the actuation system is operable to move the head from a first position to a second position in response to receiving, from the control system, a control signal having a first amplitude for a first time period, immediately after the first time period receiving, from the control system, a control signal having a second amplitude for a second period of time, and, after the second period of time receiving no control signal;

wherein the control signals during the first and second time periods, in combination with the actuation system, generate a velocity and an acceleration for the head that allows the head to coast to the second position after the second time period; and wherein the actuation system is modeled by a third order transfer function having an integrator, a first pole, and a second pole, the second pole slower than the first pole, and wherein the actuation system is further operable to move the head from the first position to the second position in response to producing a control signal for a first time period having a duration of $$T_1 = -\frac{1}{\beta_2}\log\left(C_2\left(1-\sqrt{1-\frac{e^{-\beta_2 C_1}}{C_2}}\right)\right);$$

$$C_1 = \frac{-(\beta_1\beta_2 x_1(t_0) + (\beta_1+\beta_2)x_2(t_0) + x_3(t_0))}{K_s V_{max}};$$

and $$C_2 = \frac{K_s V_{max}}{K_s V_{max} + \beta_2(\beta_1 x_2(t_0) + x_3(t_0))}$$

where $K_s$ is a constant, $V_{max}$ is a constant, $\beta_1$ is the first nonzero pole, $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time t.

11. A hard disk drive system comprising:

a disk storage media for storing information;

a head for recording and reproducing data in the disk storage media;

an actuation system for positioning the head relative to the disk storage media;

a control system for controlling the actuation system;

wherein the actuation system is operable to move the head from a first position to a second position in response to receiving, from the control system, a control signal having a first amplitude for a first time period, immediately after the first time period receiving, from the control system, a control signal having a second amplitude for a second period of time, and, after the second period of time receiving no control signal;

wherein the control signals during the first and second time periods, in combination with the actuation system, generate a velocity and an acceleration for the head that allows the head to coast to the second position after the second time period; and wherein the actuation system is modeled by the third order transfer function having an integrator, a first pole and a second pole, the second pole slower than the first pole and wherein the actuation system is further operable to move the head from the first position to the second position in response to receiving a control signal for a second time period having a duration of $$T_2 = T_1 - f(\beta_1, \beta_2)$$

where $T_2$ is the second time period, $T_1$ is the first time period, $\beta_1$ is the first pole, and $\beta_2$ is the second pole.

12. A hard disk drive system comprising:

a disk storage media for storing information;

a head for recording and reproducing data in the disk storage media;

an actuation system for positioning the head relative to the disk storage media;

a control system for controlling the actuation system;

wherein the actuation system is operable to move the head from a first position to a second position in response to receiving, from the control system, a control signal having a first amplitude for a first time period, immediately after the first time period receiving, from the control system, a control signal having a second amplitude for a second period of time, and, after the second period of time receiving no control signal;

wherein the control signals during the first and second time periods, in combination with the actuation system, generate a velocity and an acceleration for the head that allows the head to coast to the second position after the second time period; and wherein the actuation system is modeled by the third order transfer function having an integrator, a first pole and a second pole, the second pole slower than the first pole and wherein the actuation system is further operable to move the head from the first position to the second position in response to providing a control signal for a second time period having a duration of $$T_2 = T_1 - C_1$$

where $T_2$ is the second time period, $T_1$ is the first time period, and $$C_1 = \frac{(\beta_1\beta_2 x_1(t_0) + (\beta_1+\beta_2)x_2(t_0) + x_3(t_0))}{K_s V_{max}}$$

where $K_s$ is a constant and $V_{max}$ is a constant, $\beta_1$ is the first nonzero pole, and $\beta_2$ is the second nonzero pole, $t_0$ is a time immediately prior to the first time period, and $x_1(t_0)$, $x_2(t_0)$, and $x_3(t_0)$ are the position, velocity, and acceleration, respectively, of the head at time $t_0$.

* * * * *